(12) United States Patent
Alexander et al.

(10) Patent No.: US 9,394,888 B2
(45) Date of Patent: Jul. 19, 2016

(54) SYSTEM WITH DAMPER-CONTROLLED SWITCH FOR SHAPE MEMORY ALLOY ACTUATOR MOTION CONTROL

(71) Applicants: GM GLOBAL TECHNOLOGY OPERATIONS LLC, Detroit, MI (US); The Regents of the University of Michigan, Ann Arbor, MI (US)

(72) Inventors: Paul W. Alexander, Ypsilanti, MI (US); Nancy L. Johnson, Northville, MI (US); Jonathan E. Luntz, Ann Arbor, MI (US); Diann Brei, Milford, MI (US); Clover Thebolt, Ann Arbor, MI (US); Brent Utter, Ann Arbor, MI (US)

(73) Assignees: GM Global Technology Operations LLC, Detroit, MI (US); The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 14/632,583

(22) Filed: Feb. 26, 2015

(65) Prior Publication Data
US 2015/0260170 A1    Sep. 17, 2015

Related U.S. Application Data

(60) Provisional application No. 61/951,264, filed on Mar. 11, 2014.

(51) Int. Cl.
*H02K 7/10*    (2006.01)
*F03G 7/06*    (2006.01)

(52) U.S. Cl.
CPC .................................... *F03G 7/065* (2013.01)

(58) Field of Classification Search
CPC ....... F03G 7/065; H01H 36/0006; H02P 3/06; B60K 16/00
USPC .......... 318/568.17, 568.18, 611, 40, 59, 117, 318/159, 160, 162, 163, 268, 272, 430; 180/271, 272, 277, 54.2
See application file for complete search history.

(56) References Cited

U.S. PATENT DOCUMENTS

| | | | | |
|---|---|---|---|---|
| 3,791,476 A * | 2/1974 | Wernig | .................. | B60J 3/0208 180/274 |
| 6,513,617 B2 * | 2/2003 | Sasaki | ..................... | B60R 21/38 16/222 |
| 6,571,901 B2 * | 6/2003 | Lee | .......................... | B60R 21/38 180/274 |
| 7,374,008 B1 * | 5/2008 | Neal | ....................... | B60R 21/38 180/274 |
| 7,556,117 B2 * | 7/2009 | Browne | .................. | B60R 21/38 180/274 |

* cited by examiner

*Primary Examiner* — Bentsu Ro
*Assistant Examiner* — Thai Dinh
(74) *Attorney, Agent, or Firm* — Quinn Law Group, PLLC

(57) ABSTRACT

A system for controlling motion of a shape memory alloy (SMA) actuator includes a damper operatively connectable to the SMA actuator and having a movable portion that moves with the SMA actuator when the SMA actuator contracts during electrical activation. An electronic switch is operatively connectable to the SMA actuator and to the damper. The electronic switch has an open position preventing electrical power flow to the SMA actuator, and a closed position permitting electrical power flow to the SMA actuator. A biasing element applies a biasing force that urges the electronic switch to the closed position. The damper overcomes the biasing element to move the switch to the open position only when velocity of the movable portion equals or exceeds a predetermined threshold velocity, and to return to the closed position when the velocity of the movable portion falls below the predetermined threshold velocity.

19 Claims, 11 Drawing Sheets

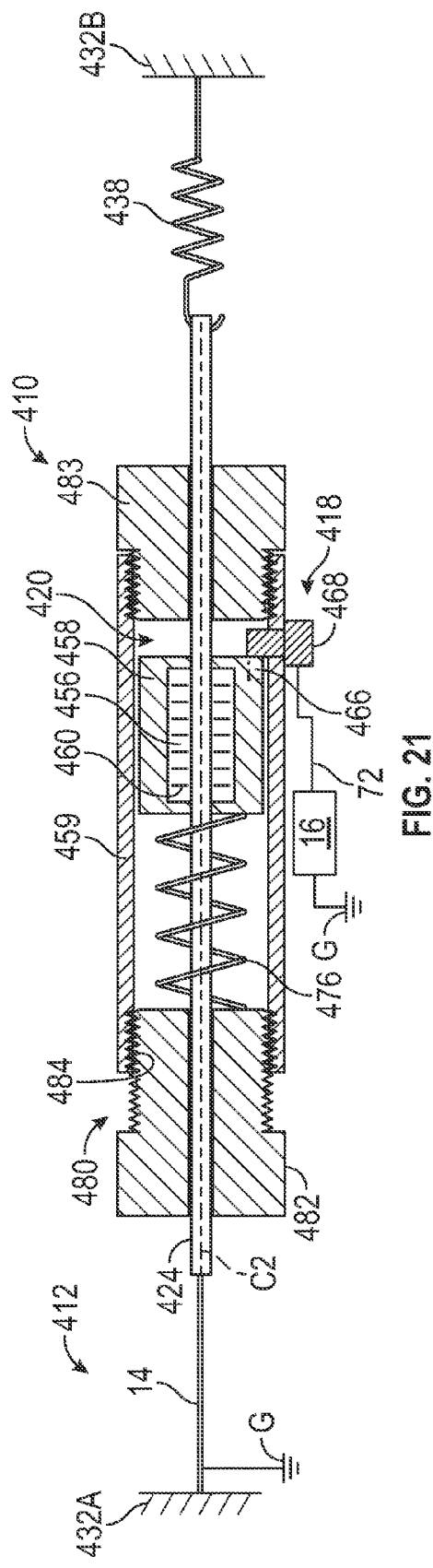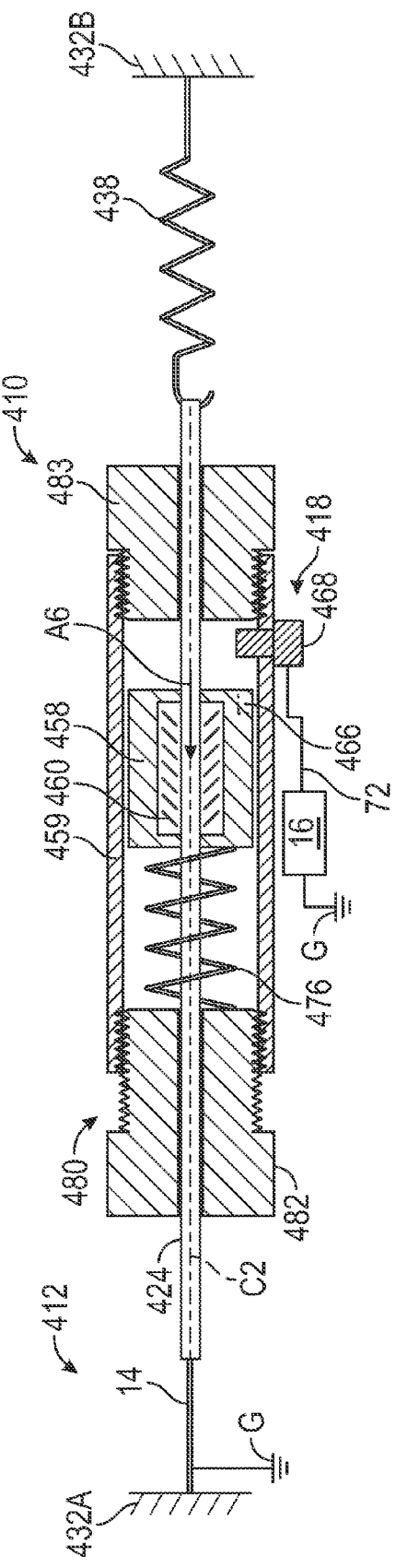

SYSTEM WITH DAMPER-CONTROLLED SWITCH FOR SHAPE MEMORY ALLOY ACTUATOR MOTION CONTROL

CROSS-REFERENCE TO RELATED APPLICATIONS

This application claims the benefit of U.S. Provisional Application No. 61/951,264, filed Mar. 11, 2014, which is hereby incorporated by reference in its entirety.

TECHNICAL FIELD

The present teachings generally include a system for controlling the motion of a shape memory alloy actuator.

BACKGROUND

Active material actuators utilize an active material that transforms when activated to provide an actuation motion. Shape memory alloys are a type of active material that transforms when activated, such as by joule heating when an electric current is applied. In general, shape memory alloy actuators have advantages over conventional actuators such as electric motors in that they can be less expensive, more compact, and lighter weight with silent operation and fewer components. The velocity of transformation of a shape memory alloy during an actuation event, however, is generally non-linear and non-uniform, and is sensitive to external factors such as voltage fluctuations, environmental temperature differences, and changing external forces.

SUMMARY

The present disclosure relates to a system for controlling the motion of a shape memory alloy (SMA) actuator. The system regulates velocity using components that are relatively non-complex and relatively low cost. The system is passive, so that the complexity and cost of a position-based control requiring sensed feedback is avoided. Moreover, the system can be configured to regulate velocity of the SMA actuator over a range of applied voltages and loads.

In one embodiment, a system for controlling motion of an SMA actuator includes a damper operatively connectable to the SMA actuator and having a movable portion configured to move with the SMA actuator when the SMA actuator contracts during electrical activation. An electronic switch is operatively connectable to the SMA actuator and to the damper. The electronic switch, also referred to herein as a damper-controlled switch (DCS) has an open position in which electrical power flow to the SMA actuator through the electronic switch is prevented, and a closed position in which electrical power flow to the SMA actuator through the electronic switch is permitted. A biasing element applies a biasing force to the damper that urges the electronic switch to the closed position. The damper is configured to overcome the biasing force of the biasing element to move the switch to the open position only when a velocity of the movable portion equals or exceeds a predetermined threshold velocity, and to return to the closed position due to the biasing force of the biasing element when the velocity of the movable portion falls below the predetermined threshold velocity.

The system may include an adjustment feature operatively connected to the biasing element and adjustable to change a preload on the biasing element. By changing the preload on the biasing element, the magnitude of the biasing force and the predetermined threshold velocity at which the switch will open is modified.

The system can be utilized in a variety of applications in which regulation of the velocity of movement of a component movable by an SMA actuator is advantageous. For example, the system may be utilized in a vehicle to control actuation of a component. In one embodiment, the system is used in a vehicle to control actuation of a deployable grab handle. The system can be used in non-automotive applications as well. Additionally, a given system can regulate motion under a range of voltages and a range of loads, making it suitable for a wide variety of different applications without modification.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 21 is a schematic illustration in partial cross-sectional view of another, linear embodiment of a system with a damper-controlled switch in a closed position and an electrically-activatable shape memory alloy actuator in accordance with another aspect of the present teachings.

FIG. 22 is a schematic illustration in partial cross-sectional view of the system of FIG. 21 with the switch in an open position.

DETAILED DESCRIPTION

Figure 1:
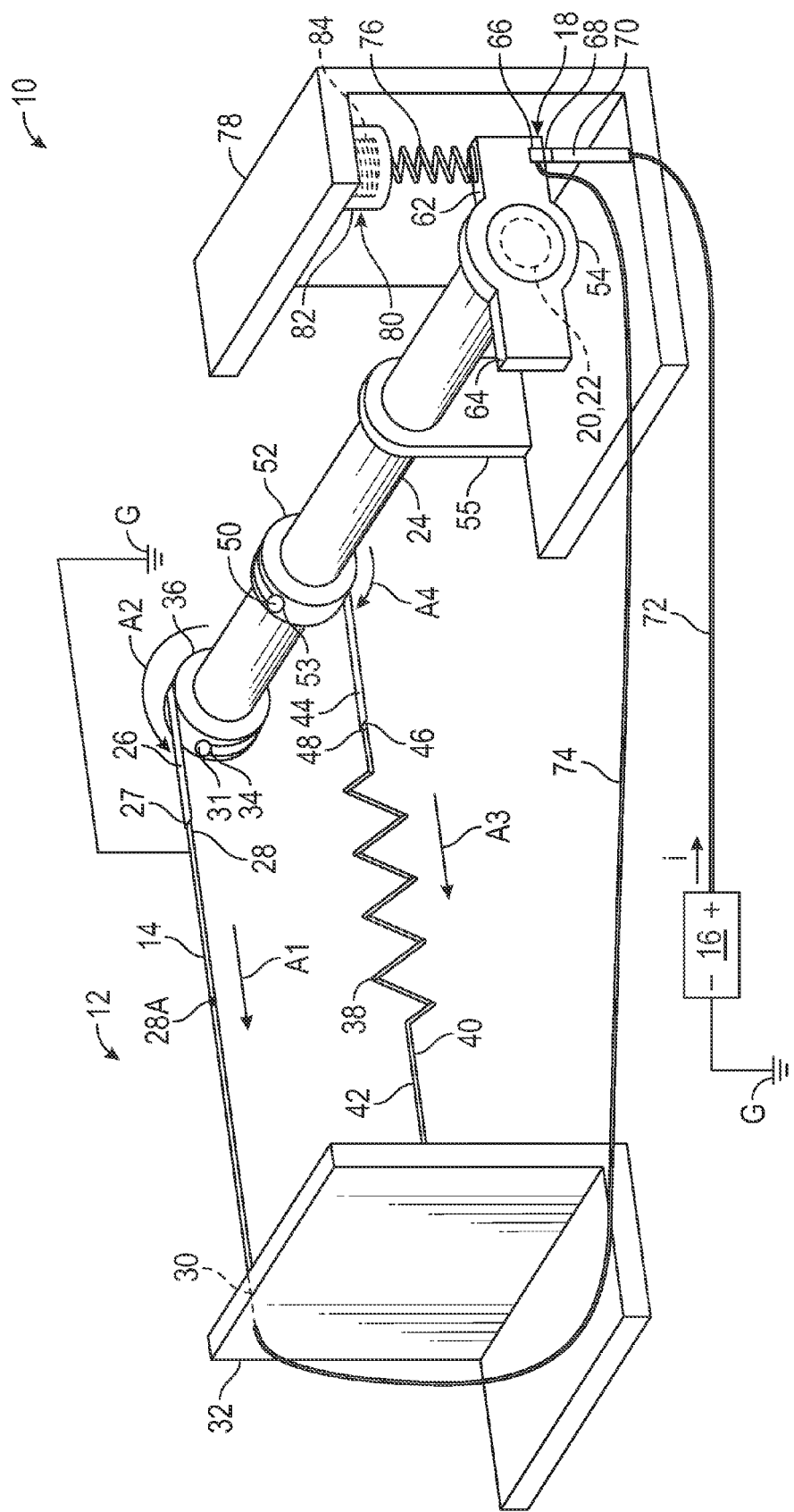
FIG. 1 is a schematic illustration in perspective view of a system with a rotating embodiment of a damper-controlled switch and an electrically-activatable shape memory alloy actuator with an associated reset spring.
Figure 2:
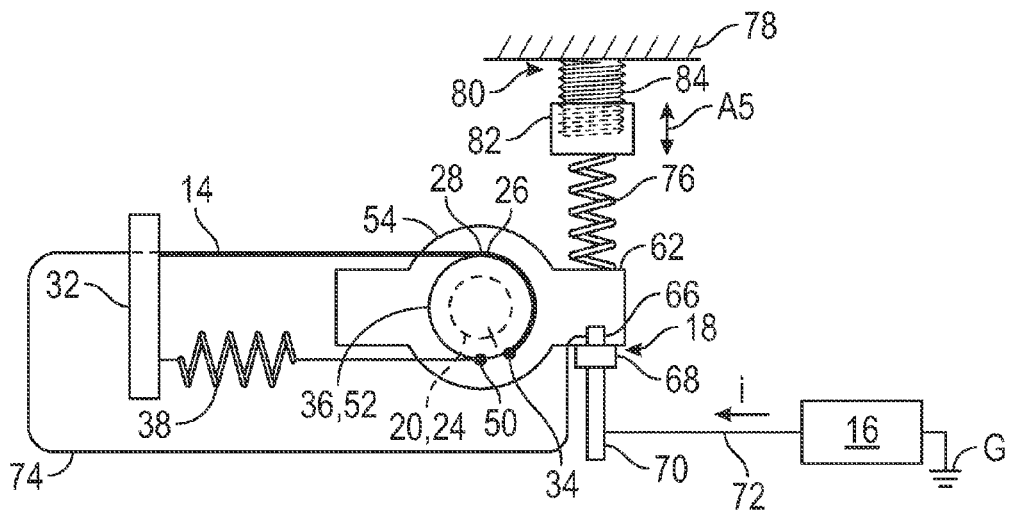
FIG. 2 is a schematic illustration in end view of a portion of the system of FIG. 1 with the switch in a closed position.

Referring to the drawings, wherein like reference numbers refer to like components throughout the views, FIG. 1 shows a system 10 with a shape memory alloy (SMA) actuator 12 that includes an SMA wire 14. The SMA actuator 12 is selectively activated by electric current i supplied by a power source 16 at a selected voltage. As discussed herein, the SMA wire 14 undergoes joule heating when electrically activated, causing the SMA wire to contract in the direction of arrow A1. The system 10 includes a damper-controlled switch (DCS) 18 that opens and closes as described herein to regulate power flow to the SMA wire 14, thus regulating the velocity of the actuation (i.e., the contraction) of the SMA wire 14.

Figure 5:
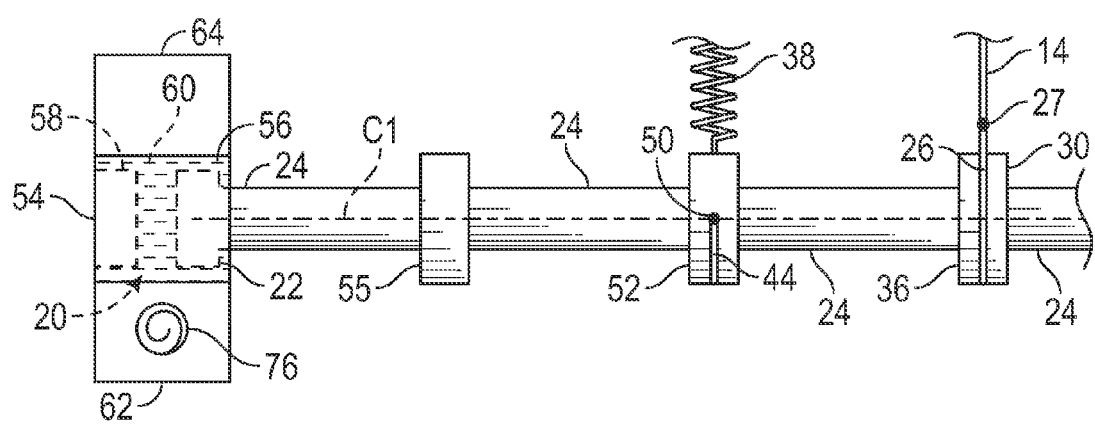
FIG. 5 is a schematic illustration in plan view of a portion of the system of FIG. 1 showing portions of a damper with hidden lines.

More specifically, referring to FIGS. 1 and 5, a damper 20 is operatively connected to the SMA actuator 12. The damper 20 includes a rotor 22 that is mounted to a shaft 24. The rotor 22 is referred to as a movable portion of the damper 20 as it is fixed to rotate with the shaft 24 about a center axis C1 of the shaft 24. The SMA actuator 12 includes a cable 26 with an end 27 crimped or otherwise fixed to an end 28 of the SMA wire 14. Another end 30 of the SMA wire 14 is held stationary by a fixed member 32. An end 34 of the cable 26 is fed into a vented set screw 31 fixed to a keyed shaft collar 36 that is mounted concentrically on the shaft 24 to rotate with the shaft 24. The cable 26 wraps clockwise from the end 27 to the end 34 around the collar 36. Accordingly, when the SMA wire 14 contracts, the actuation force of the SMA wire 14 tends to rotate the shaft 24 in the counterclockwise direction of arrow A2.

A reset spring 38 is also operatively connected to the movable portion (i.e., the rotor 22) of the damper 20. One end 40 of the reset spring 38 is fixed by a cable 42 or other feature to the fixed member 32. Another cable 44 has an end 46 crimped or otherwise fixed to an end 48 of the reset spring 38. Another end 50 of the cable 44 is fixed to a vented set screw 53 that is fixed to a keyed shaft collar 52 mounted concentrically on the shaft 24 to rotate with the shaft 24. The cable 44 wraps counterclockwise from the end 48 to the end 50 around the collar 52. The reset spring 38 is in tension, and provides a force on the cable 44 in the direction of arrow A3, and thus tends to rotate the shaft 24 in the clockwise direction of arrow A4. Accordingly, following actuation of the SMA wire 14, the reset spring 38 provides a reset force that urges the SMA wire 14 to return to a start position. The start position is the position of the SMA wire 14 when in the martensite phase, as discussed herein. For example, the start position of the SMA wire 14 may be the position shown in FIG. 1, with the end 28 in the position shown. When the SMA wire 14 is fully actuated in the austenite phase, the end 28 may move to a finish position 28A. After actuation, electric power from the power source 16 will be disabled either manually or pursuant to a control signal from a control system that is separate from the system 10. The material of the SMA wire 14 will cool, and the reset force of the reset spring 38 will then be able to pull the SMA wire 14 so that the end 28 moves back to the start position shown, as the SMA material lengthens upon return to its pre-actuation state.

Referring again to FIG. 5, the damper 20 further includes a damper casing 54 that forms a cavity 56. A plate 58 is fixed to the housing 54. Fluid 60 is in the cavity 56 between the plate 58 and the rotor 22. The rotor 22 extends into the cavity 56 and is movable relative to the damper casing 54. Fluid 60 is in the cavity 56 between the plate 58 and the rotor 22. When the shaft 24 rotates at an angular velocity greater than or equal to the predetermined threshold angular velocity corresponding to a predetermined threshold velocity of the SMA wire 14, torque through the damper 20 between the rotor 22 and the damper casing 54 becomes greater than the torque of the biasing element 76, and the damper casing 54 lifts so that the DCS 18 opens. Characteristics of the damper 20 such as the viscosity of the fluid 60, and the spacing of the plate 58 and the rotor 22 are selected to cause the DCS 18 to open at the predetermined threshold angular velocity. As the shaft 24 slows due to the SMA wire 14 no longer being heated, the difference in velocity of the rotor 22 and the damper casing 54 decreases, decreasing the damper torque. The biasing element 76 then pushes the damper casing 54 back down, closing the DCS 18, allowing the SMA wire 14 to heat again. Other configurations of the damper 20 can be used within the scope of the present teachings.

As shown in FIGS. 1-5, the damper casing 54 includes outwardly-extending arms 62, 64. The DCS 18 includes a first contact 66 mounted on the arm 62 of the damper casing 54. Alternatively, the first contact 66 could be integrally formed in the damper casing 54, such as if the damper casing 54 is an electrically-conductive material. A second contact 68 is mounted to a fixed member 70. An electrical wire 72 connects the power source 16 to the fixed member 70. The fixed member 70 can be conductive, and thus electrically connect the wire 72 to the second contact 68. Alternatively, the wire 72 can extend through a center of the fixed member 70 to directly connect to the second contact 68.

The power source 16 can be activated by a control signal, or manually, such as by a push button, to enable the supply of electric power at a selected voltage through the wire 72. When the DCS 18 is closed, the first contact 66 is in physical contact with the second contact 68, and current flows from the power source 16 through the wire 72 and the DCS 18, and through a second electrical wire 74, which is connected to the end 30 of the SMA wire 14 at the fixed member 32. Both the power source 16 and the SMA wire 14 are grounded at G. Accordingly, the DCS 18 is operatively connectable to the SMA wire 14 of the SMA actuator 12 by the wire 74, and is operatively connected to the damper 20 as the first contact 66 is mounted on the damper arm 62.

Shape memory alloys can exhibit a shape memory effect. That is, the SMA wire 14 may undergo a solid state, crystallographic phase change via a shift between a martensite phase, i.e., "martensite", and an austenite phase, i.e., "austenite." The martensite phase is a relatively soft and easily deformable phase of the shape memory alloys, which generally exists at lower temperatures. The austenite phase, the stronger phase of shape memory alloys, occurs at higher temperatures. The temperature at which a shape memory alloy remembers its high temperature form, referred to as the phase transformation temperature, can be adjusted by applying stress and other methods. Accordingly, a temperature difference between the austenite phase and the martensite phase may be the phase transformation delta T. Alternatively stated, the SMA wire 14 may undergo a displacive transformation rather than a diffusional transformation to shift between martensite and austenite. A displacive transformation is a structural change that occurs by the coordinated movement of atoms (or groups of atoms) relative to their neighbors. In general, the martensite phase refers to the comparatively lower-temperature phase and is often more deformable—i.e., Young's modulus is approximately 2.5 times lower—than the comparatively higher-temperature austenite phase.

The temperature at which the SMA wire 14 begins to change from the austenite phase to the martensite phase is known as the martensite start temperature, $M_s$. The temperature at which the SMA wire 14 completes the change from the austenite phase to the martensite phase is known as the martensite finish temperature, $M_f$. Similarly, as the SMA wire 14 is heated, the temperature at which the SMA wire 14 begins to change from the martensite phase to the austenite phase is known as the austenite start temperature, $A_s$. The temperature at which the SMA wire 14 completes the change from the martensite phase to the austenite phase is known as the austenite finish temperature, $A_f$.

Therefore, the SMA wire 14 may be characterized by a cold state, i.e., when a temperature of the SMA member is below the martensite finish temperature $M_f$ of the SMA wire 14. Likewise, the SMA wire 14 may also be characterized by a hot state, i.e., when the temperature of the SMA wire 14 is above the austenite finish temperature $A_f$ of the SMA wire 14.

In operation, the SMA wire 14 that is pre-strained or subjected to tensile stress can change dimension upon changing crystallographic phase to thereby convert thermal energy to mechanical energy. Thermal energy results from joule heating via electrical current. That is, the SMA wire 14 may change crystallographic phase from martensite to austenite and thereby dimensionally contract if pseudoplastically pre-strained so as to convert thermal energy to mechanical energy. Conversely, the SMA wire 14 may change crystallographic phase from austenite to martensite and if under stress thereby dimensionally expand and be stretched.

Pseudoplastically pre-strained refers to stretching of the SMA wire 14 while in the martensite phase so that the strain exhibited by the SMA wire 14 under that loading condition is not fully recovered when unloaded, where purely elastic strain would be fully recovered. In the case of the SMA wire 14, it is possible to load the material such that the elastic strain limit is surpassed and deformation takes place in the martensitic crystal structure of the material prior to exceeding the true plastic strain limit of the material. Strain of this type, between those two limits, is pseudoplastic strain, called such because upon unloading it appears to have plastically deformed. However, when heated to the point that the SMA wire 14 transforms to its austenite phase, that strain can be recovered, returning the SMA wire 14 to the original length observed prior to application of the load.

Figure 3:
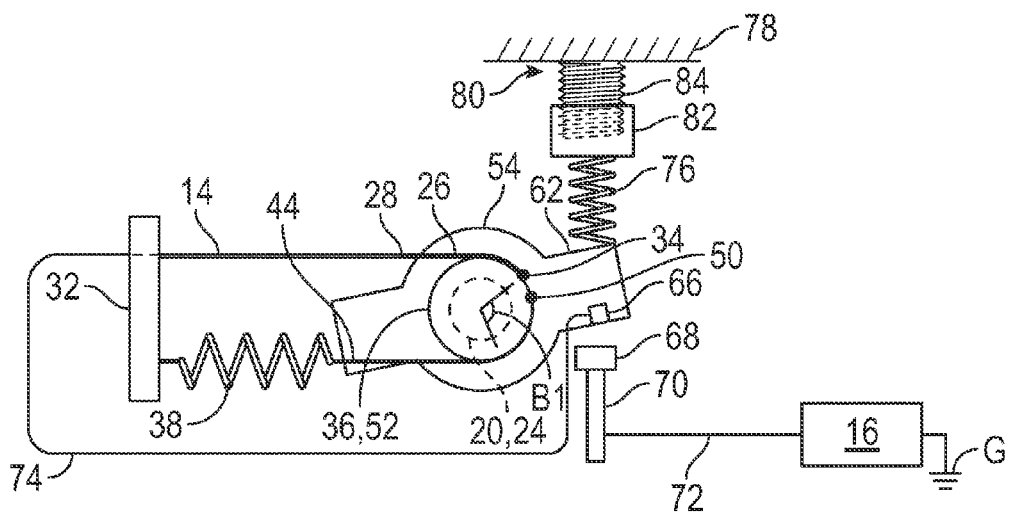
FIG. 3 is a schematic illustration in end view of a portion of the system of FIG. 1 with the switch in an open position.
Figure 4:
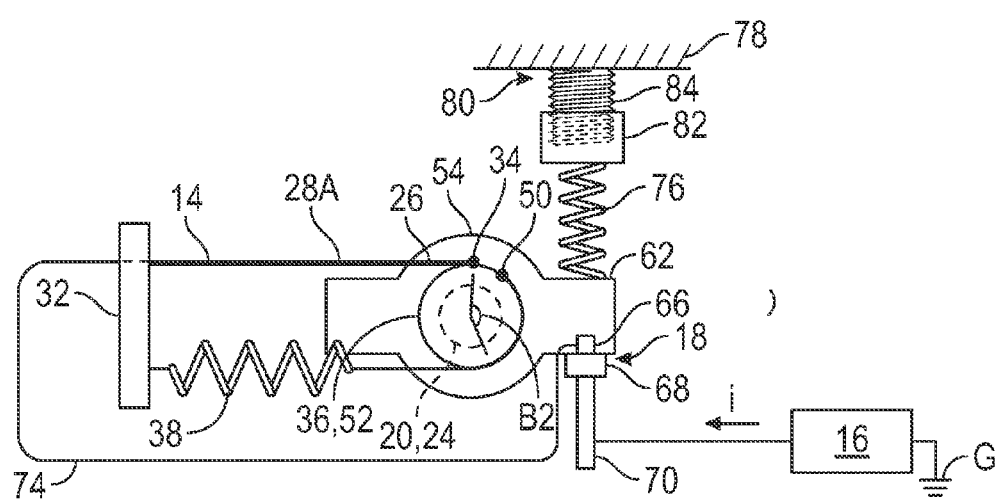
FIG. 4 is a schematic illustration in end view of a portion of the system of FIG. 1 with the switch returned to a closed position.

Although joule heating of the SMA wire 14 is permitted when the DCS 18 is closed, the DCS 18 also has an open position, shown in FIG. 3, in which electrical power flow to the SMA wire 14 of the SMA actuator 12 through the DCS 18 is prevented because the first contact 66 is spaced from and not in contact with the second contact 68.

The system 10 includes a biasing element 76 that applies a biasing force and torque to the damper 20 that urges the DCS 18 to the closed position. The biasing element 76 shown in FIG. 1 is a compression spring connected to and extending between a stationary outer housing 78 of the damper 20 and the damper arm 62. The shaft 24 is supported for rotation by a support 55 extending from the stationary housing 78. The shaft 24 extends through an opening in the support 55. The opening is sized to permit rotation of the shaft 24 relative to the support 55.

An adjustment feature 80 may be positioned on the stationary outer housing 78 and operatively connected to the biasing element 76. The adjustment feature 80 shown in FIG. 1 includes an internally-threaded knob 82 threaded on an externally-threaded screw 84. The adjustment feature 80 is adjustable by turning the knob 82 so that the knob 82 travels up or down the screw 84 as indicated by arrow A5, changing the compression of the biasing element 76, and thereby changing a preload on the biasing element 76. The preload of the biasing element 76 is equal to the magnitude of the biasing force that the biasing element 76 exerts on the arm 62 to bias the arm 62 to the position shown in FIG. 1 in which the DCS 18 is closed.

When the SMA wire 14 is activated with electrical current, it heats up, causing it to contract in length. When the velocity of contraction is less than a predetermined threshold velocity, the shaft 24 will rotate in the counterclockwise direction A2 at an angular velocity directly related to the velocity of the SMA wire 14, and torque through the damper 20 will be less than torque of the biasing element 76 so that the DCS 18 will remain closed. However, when the velocity of SMA wire 14 is greater than or equal to the predetermined threshold velocity, the angular velocity of the shaft 24 will exceed the predetermined threshold angular velocity, and torque through the damper 20 will overcome the biasing torque of the biasing element 76 that acts to maintain the arm 62 in the position of FIG. 2 with the DCS 18 closed. The arm 62 of the damper casing 54 will compress against the biasing element 76, overcoming the biasing force of the biasing element 76, thus allowing the arm 62 to lift from the position shown in FIG. 2 to a position in which the DCS 18 is open, such as the position shown in FIG. 3. With the DCS 18 open, electrical power flow to the SMA wire 14 ceases, thus halting activation of the SMA material and slowing contraction of the SMA wire 14. As indicated in FIG. 3, the shaft 24 has rotated an angle B1 when the DCS 18 is in the open position. The angle B1 can be measured from a start position of the end 34 of the cable 26 attached to the SMA wire 14, to the position of the end 34 when the damper housing 54 lifts to open the DCS 18.

Without electrical activation, the temperature of the SMA wire 14 will begin to cool, and the velocity of contraction of the SMA wire 14 and the angular velocity of the shaft 24 and rotor 22 will slow. Once the velocity of the SMA wire 14 drops below the predetermined threshold velocity, the angular velocity of the shaft 24 and rotor 22 slows, reducing torque through the damper 20 so that the torque of the biasing element 76 causes the damper casing 54 to return to the position of FIG. 2, and the DCS 18 closes again. During the time that the SMA wire 14 moves from the open position of FIG. 3 back to the closed position of FIG. 4, the SMA wire 14 continues to contract, as indicated by the angle B2 (shown in FIG. 4), which is larger than the angle B1. However, this contraction is at velocities less than the predetermined threshold velocity. With the DCS 18 closed, electric current flow to the SMA wire 14 through the DCS 18 resumes, and the velocity of contraction of the SMA wire 14 increases again. The DCS 18 can repeatedly open and close in this manner during the actuation event of the SMA wire 14 as it transitions from martensite to austenite, thus providing electrical activation of the SMA wire 14 in an oscillating, on/off manner to regulate the velocity of the SMA wire. The on/off operation of the DCS 18 pursuant to the movement of the shaft 24, and the relative torques of the damper 20 and biasing element 76 mimics active control of the SMA wire 14 but uses passive components, as the system 10 requires no feedback of the position of the SMA wire 14 in order to control the motion of the SMA wire 14. Accordingly, sensors and other expensive components that may be sensitive to environmental factors are not required in order to provide a motion of a component attached to the SMA actuator 12 that is perceived as relatively smooth in comparison to the motion of a component that is not controlled by the system 10. At the end of the actuation event, final transformation of the SMA wire 14 occurs at a velocity below the predetermined threshold velocity, with angular rotation of the shaft 24 below the predetermined threshold angular velocity, and no further switching occurs.

Motion control of the SMA wire 14 using the system 10 is tunable, allowing use in a variety of applications. For example, the preload of biasing element 76 can be adjusted using the adjustment feature 80, such as by turning the knob 82. In addition the stiffness of the biasing element 76 can be selected to provide a desired range of loads of the biasing element 76 over the range of compression of the biasing element 76 as the arm 62 moves from the position of FIG. 2 to the position of FIG. 3. Still further, the damper characteristics, such as the viscosity of fluid in the damper 20, can be chosen to specify the torque and angular speed at which the damper 20 will cause the DCS 18 to open.

Figure 6:
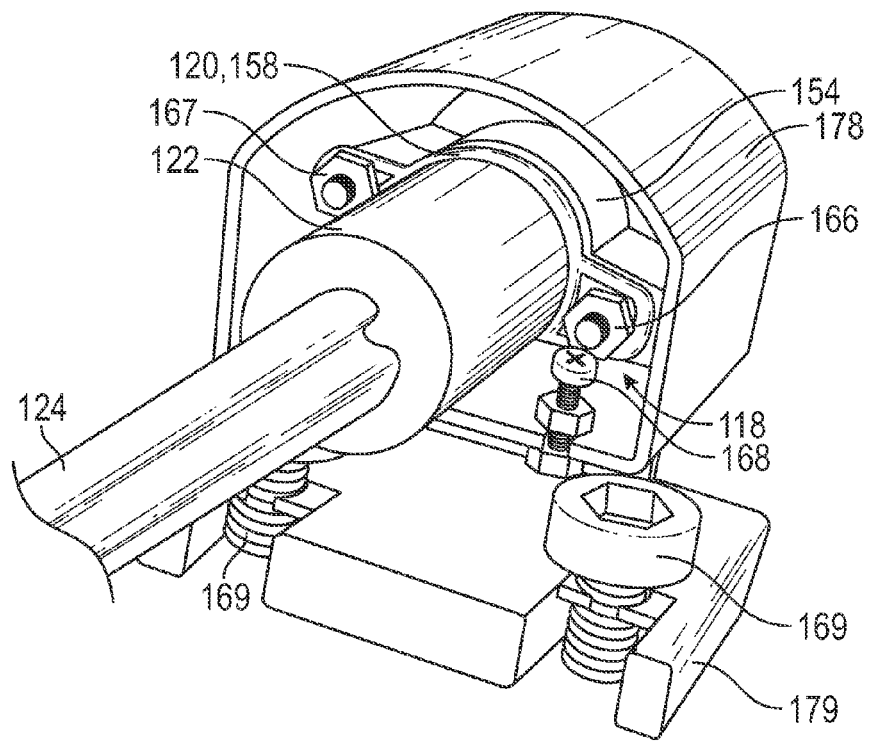
FIG. 6 is a schematic illustration in fragmentary perspective view of an alternative embodiment of a shaft, damper, and damper housing for use in the system of FIG. 1.
Figure 7:
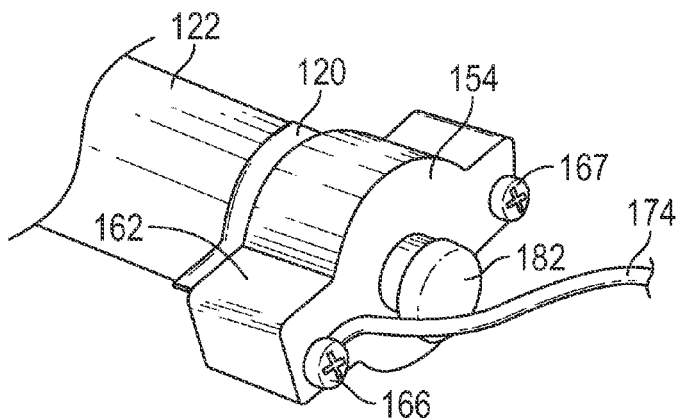
FIG. 7 is a schematic illustration in fragmentary perspective view of a portion of the damper and shaft of FIG. 6 with a portion of an electrical wire.

FIG. 6 is a schematic illustration in fragmentary perspective view of an alternative embodiment of a shaft 124, damper 120, a rotor 122, damper casing 154, and damper housing 178 for use in place of the corresponding components in the system 10 of FIG. 1. Corresponding components functioning as described with respect to components in FIGS. 1-5 are indicated with reference numbers increased by 100. More specifically, a damper-controlled switch (DCS) 118 includes a first contact 166 that moves with the arm 162 of the damper casing 154, and a second contact 168 that is fixed to the damper housing 178. An electrical wire 174 shown in FIG. 7 connects to the first contact 166 to deliver power to the SMA wire 14 of FIG. 1. Bolts 169 allow a base portion 179 of the damper housing 178 to be fixed in a desired position for a specific application.

Figure 8:
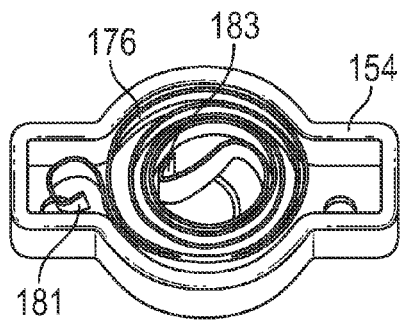
FIG. 8 is a schematic illustration of a damper housing of the damper of FIG. 6 and a biasing element.

FIG. 8 shows a biasing element that is a torsion spring 176. The torsion spring 176 has one end 181 that can be fixed by a screw 167 (shown in FIG. 7) that extends through the damper casing 154 to secure a plate 158 (shown in FIG. 8) of the damper 120 to the damper casing 154. The end 181 acts on the damper casing 154 through the screw 167 so that torque through the damper 120 must exceed the biasing torque of the torsion spring 176 for the damper casing 154 to turn, lifting the arm 162 and causing the first contact 166 to move away from the second contact 168 and the switch 118 to open. The biasing torque (i.e., preload) of the torsion spring 176 can be adjusted by turning an adjustment knob 182 (shown in FIG. 7) that has a slot through which another end 183 of the torsion spring 176 extends. The knob 182 rotates inside a bushing fixed into the housing 178. Once the knob 182 is adjusted to a desired setting, it is held in place by a set screw mounted in the side of the bushing which can be tightened against the knob 182 to hold it in place or allow it to be rotated. Other means of locking the knob 182 in place are possible including simply relying on friction between it and a properly designed bushing.

A prototype system 10 was tested in an experimental apparatus that included the SMA actuator 12 and data acquisition hardware. The SMA wire 14 tested was a Dynalloy FLEXINOL 90C wire 18 inches in length and 0.012 inches in diameter. The cable 26 was a KEVLAR thread. To collect data on the system 10, a load cell (not shown) was operatively connected to the end 30 of the SMA wire 14 and a rotary encoder (not shown) was connected to the end of the shaft 24 opposite the DCS 18.

Figure 9:
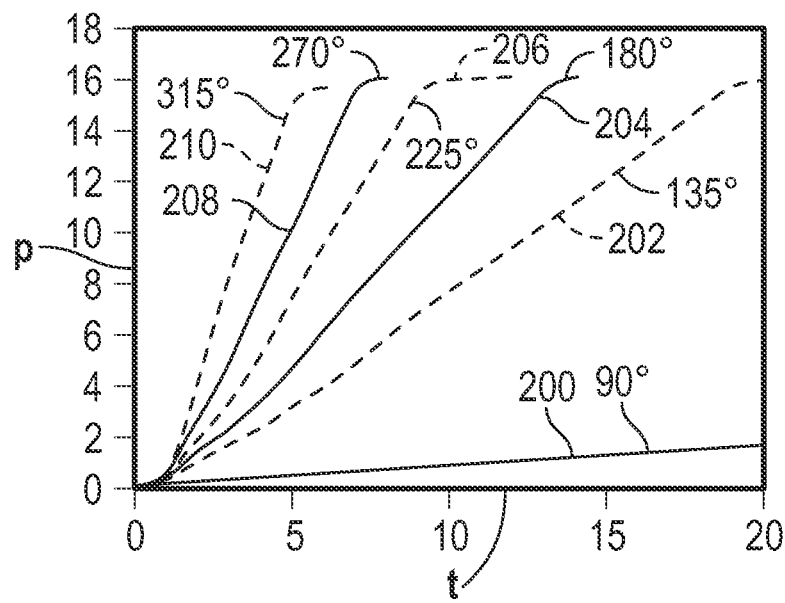
FIG. 9 is a plot of position in millimeters versus time in seconds for an end of the shape memory alloy actuator of FIG. 1 during actuation at various preloads of the biasing element indicated by a number of degrees a preload adjustment feature is turned.

FIG. 9 is a plot of position p of the SMA wire 14, for example the position of the end 28, versus time t in seconds, for various preloads of the biasing element 76 as a constant power source voltage was provided from the power source 16. The tunability of the predetermined threshold velocity was explored by varying the preload of the biasing element 76 by turning the speed threshold tuning adjustment knob 82 in 45 degree (⅛ turn) increments, one for each actuating event. Plots 200, 202, 204, 206, 208, and 210 are indicated in which the adjustment knob 182 is at 90 degrees, 135 degrees, 180 degrees, 225 degrees, 270 degrees, and 315 degrees, respectively. Additional plots (not shown) where the knob 82 was further turned in 45 degree increments from 360 degrees up to a maximum of 810 degrees resulted in an even greater slope than the trace for the 315 degree knob position, and resulted in actuation in a shorter amount of time. FIG. 9 illustrates that as the spring preload of biasing element 76 was increased, the slope of the plot increased (i.e., actuation time is shorter) because the DCS 18 was held down in the closed position by the biasing element 76 for a higher percentage of the actuation event time.

Figure 10:
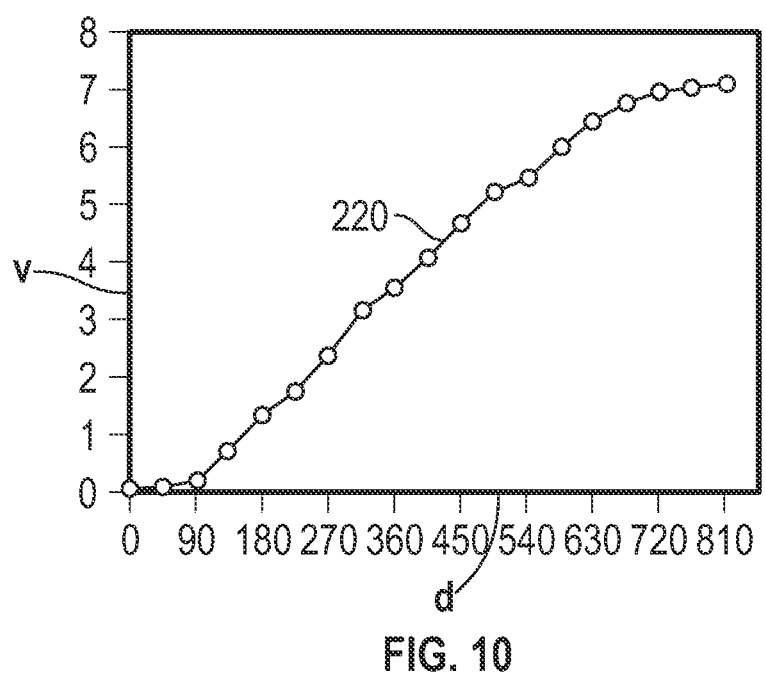
FIG. 10 is a plot of average velocity in millimeters per second of the shape memory alloy actuator of FIG. 1 versus a number of degrees a preload adjustment feature is turned to establish various preloads of the biasing element of FIG. 1.

In FIG. 10, the flat region in the plot 220 of average velocity v in millimeters per second versus biasing element 76 preload angle d in degrees at the 0 and 45 degree settings of the adjustment knob 82 indicates that the spring preload was not sufficient to overcome dry friction and hence, once the DCS 18 was open, it remained open and no further motion occurred, i.e. the complete actuation event did not take place. To achieve complete actuation, a minimum setting of 90 degrees was required. At higher preloads, the average velocity levels off, starting at a setting of 720 degrees (two rotations or the adjustment knob 82). This represents the opposite situation in which the preload of biasing element 76 is so high that the DCS 18 always remains closed, essentially replicating an actuation event of the SMA actuator 12 without the DCS 18 because the DCS 18 is not inducing switching. These two extremes establish an operable range of attainable constant velocities for a given voltage (8V) which spans almost two orders of magnitude.

Figure 11:
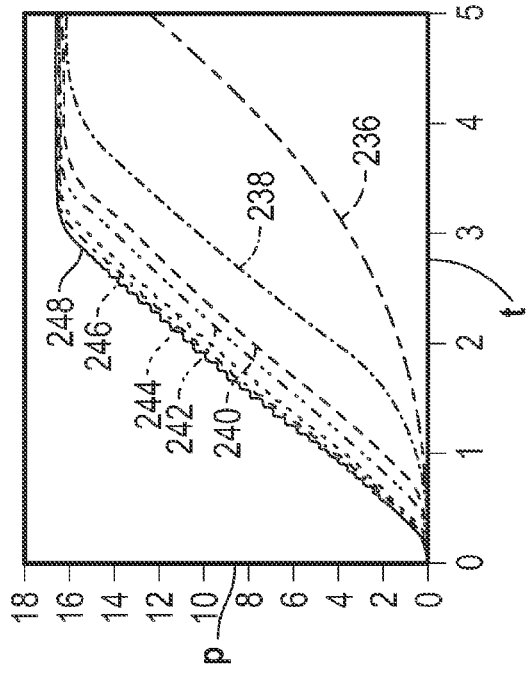
FIG. 11 is a plot of position in millimeters versus time in seconds for an end of the shape memory alloy actuator of FIG. 1 during actuation for various voltages in volts applied to the shape memory alloy actuator if used without the damper-controlled switch.

As indicated in FIGS. 11-18, the damper 20 and DCS 18 are configured to limit the velocity of the SMA wire 14, the shaft 24, and the movable portion of the damper 20 (i.e., the rotor 22) over a range of loads and voltages applied to the SMA actuator 12. FIG. 11 shows plots of position p in millimeters (mm) versus time t in seconds for the end 28 of SMA wire 14 of FIG. 1 during actuation for various voltages in volts (V) of the power source 16 applied to the SMA wire 14 if used without the DCS 18 (or with the DCS 18 always closed). Plots 222, 224, 226, 228, 230, 232, and 234 are for voltages of 6V, 7V, 8V, 9V, 10V, 11V, and 12V, respectively. The motion trajectory of the SMA actuator 12 without the operating DCS 18 (i.e., without the DCS 18 oscillating between the open and closed positions) changes significantly with increasing voltage, becoming faster as voltage increases.

Figure 12:
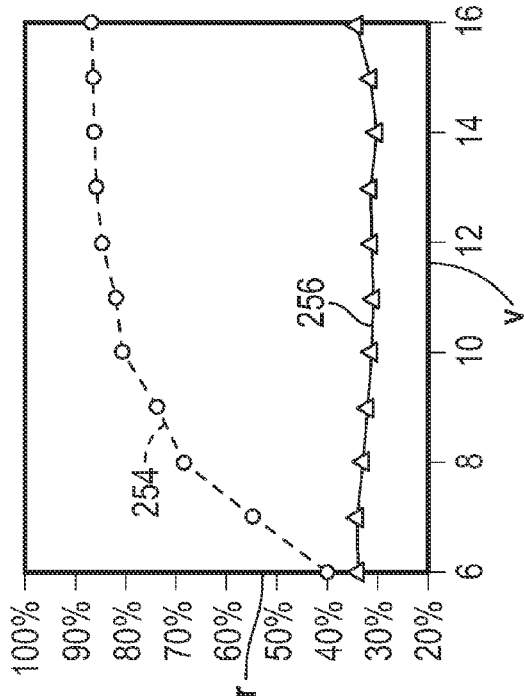
FIG. 12 is a plot of position in millimeters versus time in seconds for an end of the shape memory alloy actuator of FIG. 1 during actuation for various voltages in volts applied to the shape memory alloy actuator if used with the damper-controlled switch.

FIG. 12 is a plot of position p in millimeters (mm) versus time t in seconds for the end 28 of SMA wire 14 of FIG. 1 during actuation for various voltages in volts (V) of the power source 16 applied to the SMA wire 14 if used with the DCS 18. Plots 236, 238, 240, 242, 244, 246, and 248 are for voltages of 6V, 7V, 8V, 9V, 10V, 11V, and 12V, respectively. In contrast to FIG. 11, FIG. 12 shows that the motion trajectory of the SMA actuator 12 augmented by the operating DCS 18 varies little above 7V, where the plots form a tight group.

Figure 13:
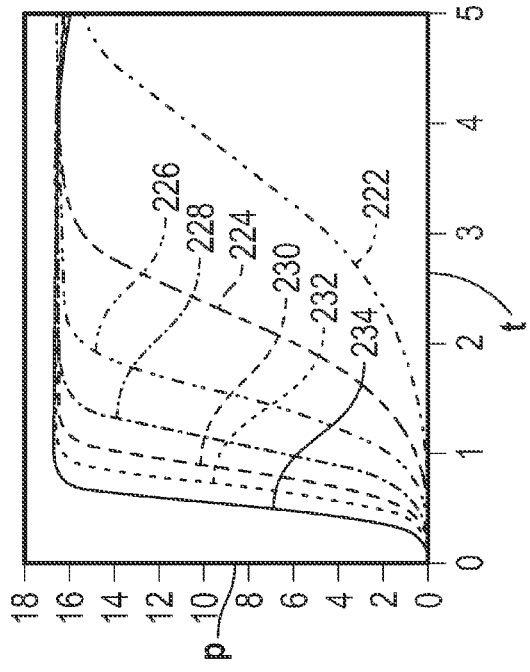
FIG. 13 is a plot of average velocity in millimeters per second versus voltage in volts of the shape memory alloy actuator of FIG. 1 both with and without the damper-controlled switch.

FIG. 13 shows plots of average velocity v in millimeters (mm) per second versus voltage in volts (V) of the power source 16 applied to the SMA actuator 12 of FIG. 1 with the DCS 18 operating, and plots both with (plot 250) and without (plot 252) the operating DCS 18. The motion trajectory of the SMA actuator 12 without the DCS 18 operating changes significantly with increasing voltage, becoming faster as voltage increases. In contrast, the motion trajectory of the SMA actuator 12 augmented by the operating DCS 18 varies little above 7V, where the plots form a tight group. The SMA actuator 12 without the operating DCS 18 produced a 15-fold increase in average velocity from 2.5 mm/s at 6V to 36.5 mm/s at 16V, while the SMA actuator 12 with the DCS 18 operating yielded less than a 3-fold increase in average velocity from 2 mm/s at 6V to 5.5 mm/s at 16V, reducing the variation in average velocity by 90 percent in this voltage range.

Figure 14:
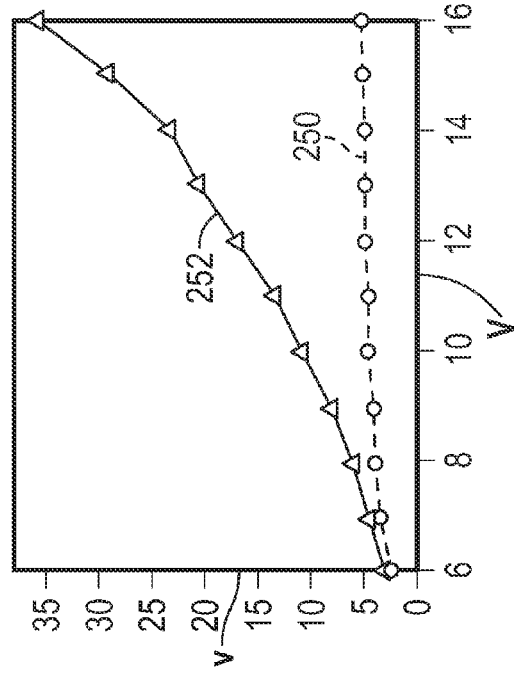
FIG. 14 is a plot of the ratio of average velocity to peak velocity versus voltage in volts of the shape memory alloy actuator of FIG. 1 both with and without the damper-controlled switch.

FIG. 14 shows plots of the ratio r of average velocity to peak velocity versus voltage in volts (V) of the SMA actuator 12 of FIG. 1 both with (plot 254) and without (plot 256) the operating DCS 18. As a metric indicating the uniformity of motion, the ratio r of the average velocity divided by the peak velocity during the full actuation event was computed for each voltage. A motion uniformity of 100 percent is ideal, representing constant velocity over the entire actuation event, whereas a score of near-zero represents a spike in velocity at some point in the actuation event. The SMA actuator 12 without the operating DCS 18 (plot 254) produced a consistently low motion uniformity of approximately 33 percent over all voltages, indicating the motion is poorly regulated but that the shape of the motion trajectory is fairly similar across all voltages. Comparatively, the SMA actuator 12 augmented by the operating DCS 18 delivered a motion uniformity of 39 percent at 6V, but steadily improved to 69 percent at 8V and reached 87 percent at 16V. Below 8V, the performance improvement due to the addition of the DCS 18 was less significant because almost no switching occurs. However as the voltage and hence the length of the switching period within the actuation event increases, the motion uniformity increases. At 8V, switching occurs during approximately 70 percent of the actuation event, and at 16V switching occurs during approximately 92 percent of the actuation event, producing the corresponding improvement in motion uniformity. At 8V the DCS 18 effectively doubles the motion quality, and further improves motion quality with higher voltages.

This study establishes that the DCS 18 as controlled via the shaft 24, damper 20, and biasing element 76 is effective over a wide range of operating voltages and hence is appropriate for a much larger set of applications than just an actuator using an SMA wire 14. Furthermore, for applications in which the system voltage fluctuates over a range, adding the DCS 18 to the SMA actuator 12 ensures the desired motion will not be affected. Finally, achieving voltage insensitivity via the DCS 18 is likely more cost effective than other, more complex control approaches.

Figure 15:
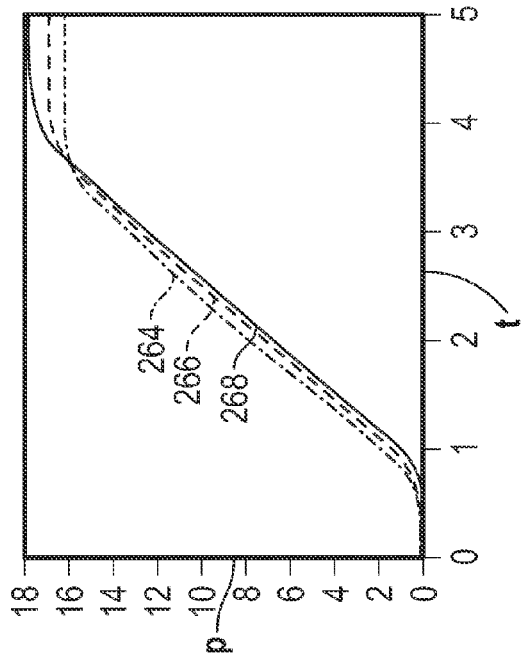
FIG. 15 is a plot of position in millimeters versus time in seconds for an end of the shape memory alloy actuator of FIG. 1 during actuation at 10 volts for various loads in kilograms applied to the shape memory alloy actuator if used without the damper-controlled switch.
Figure 16:
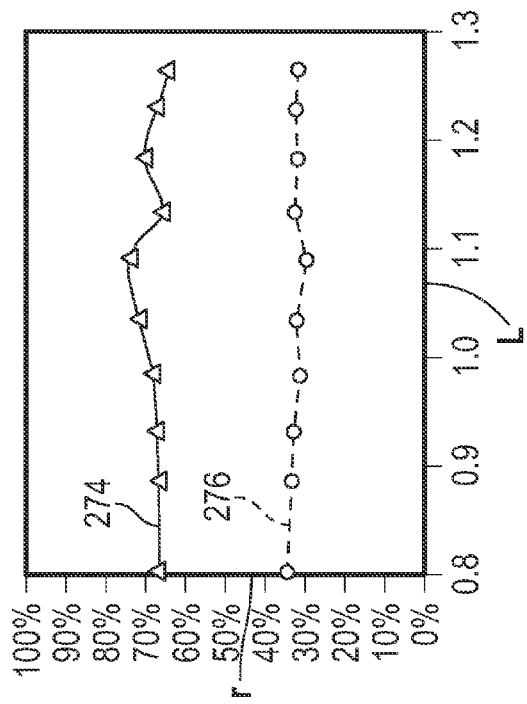
FIG. 16 is a plot of position in millimeters versus time in seconds for an end of the shape memory alloy actuator of FIG. 1 during actuation at 10 volts for various loads in kilograms applied to the shape memory alloy actuator if used with the damper-controlled switch.

The sensitivity of the DCS 18 to fluctuations in load was measured by conducting actuation events of the SMA actuator 12 with and without the DCS 18 while applying a series of discrete loads and knob 82 turned 360 degrees. FIG. 15 shows plots of position p in millimeters (mm) versus time t in seconds for an end 28 of the SMA wire 14 of FIG. 1 during actuation at 10V for various loads in kilograms (kg) applied to the SMA wire 14 if used without the DCS 18. Plot 258 is with a load of 0.81 kgs. Plot 260 is with a load of 1.04 kgs. Plot 262 is with a load of 1.24 kgs. FIG. 16 shows plots of position p in millimeters (mm) versus time t in seconds for an end 28 of the SMA wire 14 of FIG. 1 during actuation at 10V for various loads in kilograms (kg) applied to the SMA wire 14 if used with the DCS 18. Plot 264 is with a load of 0.81 kgs. Plot 266 is with a load of 1.04 kgs. Plot 268 is with a load of 1.24 kgs. The load was varied such as by changing the position of the reset spring mounting block (e.g., fixed member 32 or a separate mounting block if the SMA wire 14 and the reset spring 38 are fixed to different fixed members 32) thereby changing the preload on biasing element 76 and the tension on the SMA wire 14. The SMA wire 14 was cycled through a full actuation event and the motion trajectory was recorded for both scenarios at each load setting. The motion trajectories produced by the SMA actuator 12 without the DCS 18 (FIG. 15) were compared to the motion trajectories produced by the SMA actuator 12 augmented with the operating DCS 18 (FIG. 16) where the plots are grouped more tightly.

Figure 17:
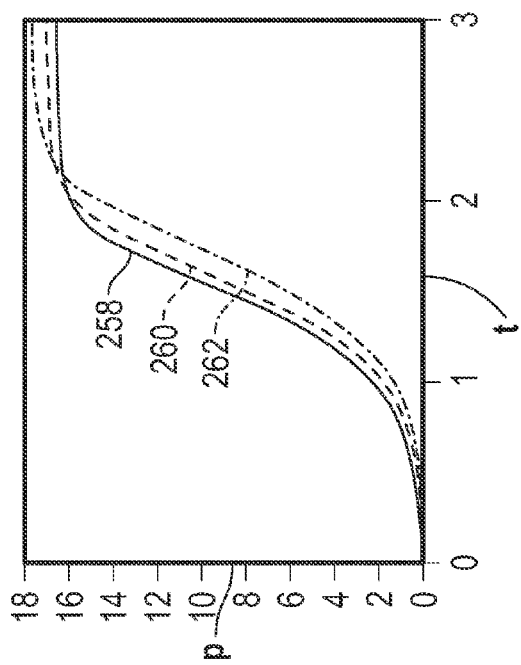
FIG. 17 is a plot of average velocity in millimeters per second versus loads in kilograms applied to the shape memory alloy actuator of FIG. 1 both with and without the damper-controlled switch.
Figure 18:
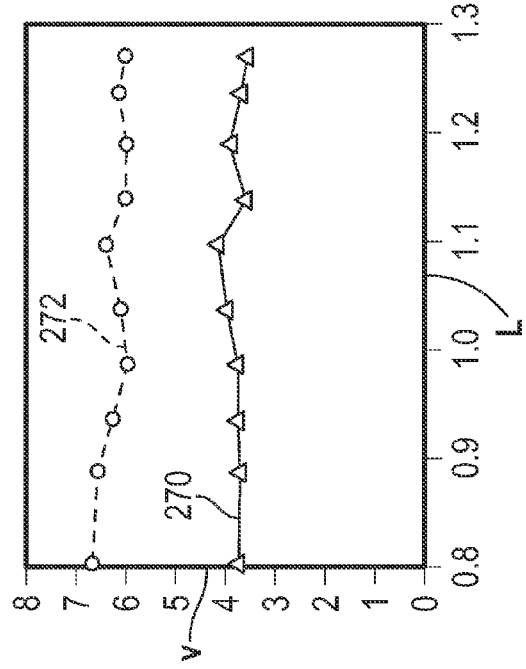
FIG. 18 is a plot of the ratio of average velocity to peak velocity versus loads in kilograms applied to the shape memory alloy actuator of FIG. 1 both with and without the damper-controlled switch.

FIG. 17 shows plots of average velocity v in millimeters (mm) per second versus loads L in kilograms (kg) applied to the SMA wire 14 of FIG. 1 both with (plot 270) and without (plot 272) the operating DCS 18. Readings are indicated with triangles in plot 270 and with circles in plot 272. FIG. 18 shows plots of the ratio r of average velocity to peak velocity versus load L in kilograms (kg) applied to the SMA wire 14 of FIG. 1 both with (plot 274) and without the operating DCS 18 (plot 276). Readings are indicated with triangles in plot 274 and with circles in plot 276. While the SMA actuator 12 without the DCS 18 exhibited a 9 percent decrease in average velocity from 6.7 mm/s at 0.78 kgs to 6.1 mm/s at 1.24 kgs, the SMA actuator 12 augmented with the operating DCS 18 exhibited just a 2 percent decrease in average velocity from 3.74 mm/s to 3.66 mm/s over the same change in peak load. In addition, the SMA actuator 12 with the operating DCS 18 was found to have over twice the motion uniformity of the SMA actuator 12 without the DCS 18. Specifically, the SMA actuator 12 without the operating DCS 18 produced an average motion uniformity of just 33 percent whereas the DCS-augmented SMA actuator 12 yielded an average motion uniformity of 69 percent. The improvement allows SMA actuators to be selected for a wider variety of applications given the increased range of load capability, or in applications where the load is known to fluctuate. This also enables the same DCS 18, damper 20, and damper casing 54 to be used for different actuation applications without changing the DCS 18, damper 20, and damper casing 54 size or design, boosting mechanism volume, lowering costs, and enhancing robustness.

Figure 19:
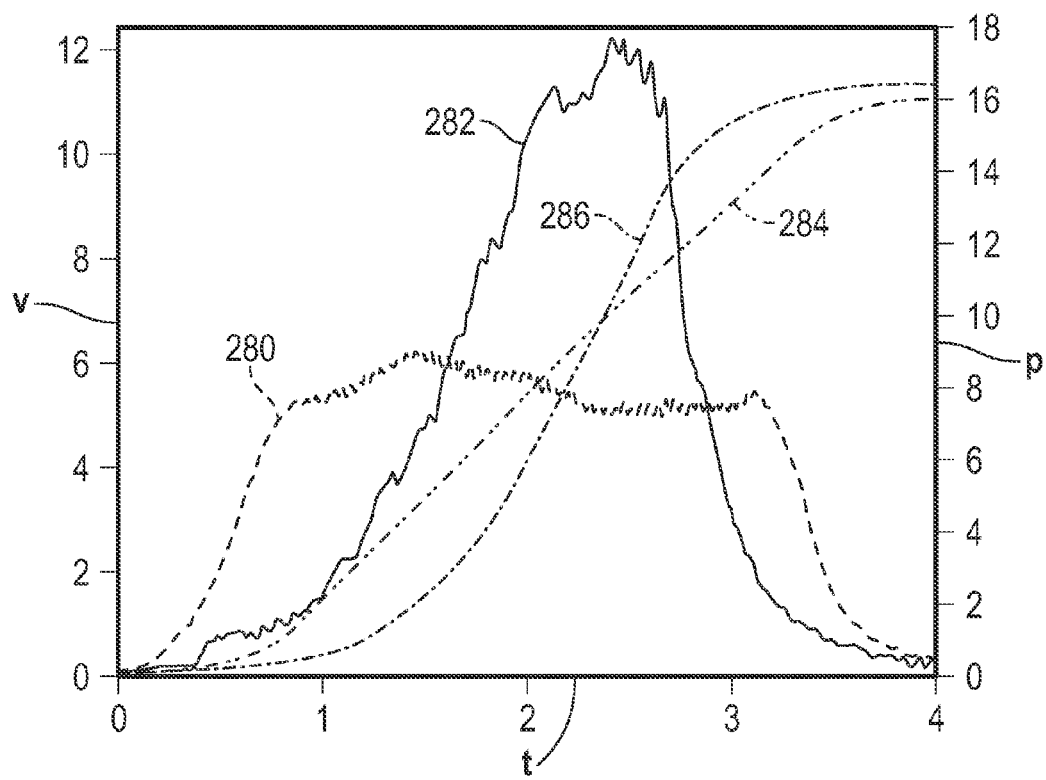
FIG. 19 is a plot of velocity in millimeters on the left axis versus time in seconds, and actuator position in millimeters on the right axis versus time in seconds for an end of the shape memory alloy actuator of FIG. 1 during actuation both with and without the damper-controlled switch.

FIG. 19 shows plots of velocity v of the end 28 of the SMA wire 14 (FIG. 1) in millimeters per second (mm/sec) on the left axis and position p of the end 28 of the SMA wire 14 (FIG. 1) in millimeters on the right axis versus time in seconds (s) during actuation both with and without the operating DCS 18. Plot 280 is velocity v versus time t with the operating DCS 18. Plot 282 is velocity v versus time t without the operating DCS 18. Plot 284 is the position p versus time t with the operating DCS 18. Plot 286 is the position p versus time t without the operating DCS 18.

The addition of the operating DCS 18 produced nearly constant velocity of the SMA actuator 12, performing significantly better than the SMA actuator 12 without the DCS 18. The SMA wire 14 motion without the operating DCS 18 at 7V produces a velocity profile which gradually increases during the SMA wire material transformation process, whereas the same SMA wire 14 at 8V operatively connected with the operating DCS 18 produces a near-constant shaft 24 rotational velocity through the same time period. This improvement can be quantified by comparing the range from baseline velocity to peak velocity of the SMA wire 14 for the SMA actuator 12 with the operating DCS 18 during the regulated transformation period to the range from baseline velocity to peak velocity of the SMA wire 14 for the SMA actuator 12 without the operating DCS 18 during the same time period. While velocity of the SMA actuator 12 without the operating DCS 18 ranged from 1 mm/s to a peak at 12 mm/s, the velocity of the actuator 12 with the same SMA wire 14 fitted with the operating DCS 18 stayed within the narrow range of 5 mm/s to 6 mm/s, reducing the velocity range by a factor of 11.

Figure 20:
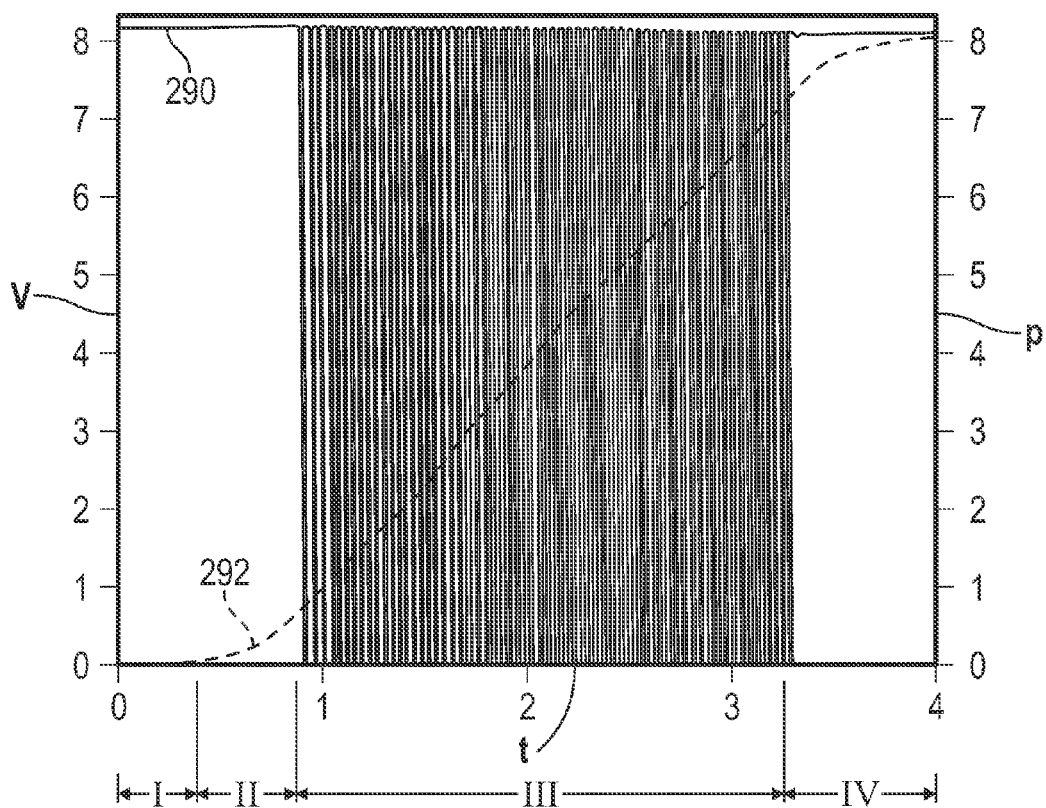
FIG. 20 is a plot of applied voltage in volts on the left axis versus time in seconds, and a plot of actuator position in millimeters on the right axis versus time in seconds during actuation of the shape memory alloy actuator of FIG. 1 with the damper controlled switch.

FIG. 20 is a plot of applied voltage V in volts (V) on the left axis versus time t in seconds (s), and a plot of the position p of the end 28 of the SMA wire 14 in millimeters (mm) on the right axis versus time t in seconds (s) during actuation of the SMA actuator 12 of FIG. 1 with the operating DCS 18. Plot 290 shows applied voltage versus time, and plot 292 shows position versus time of the SMA wire 14 with the operating DCS 18. Plot 292 demonstrates the successive stages of material transformation of the SMA wire 14 with the operating DCS 18. In stage I, from zero to approximately 0.5 seconds, electric power is delivered to the SMA wire 14 but no motion occurs until the austenite start temperature of the SMA wire 14 is reached. At the beginning of stage II, the SMA wire 14 contracts as it begins to transform from martensite to austenite causing the shaft 24 to rotate, but the speeds are still slow enough that the damper 20 does not engage. However after 0.9 seconds, in stage III, the increasing rate of material transformation of the SMA wire 14 and associated contraction of the SMA wire 14 causes the rotational velocity of the shaft 24 to reach the critical point at which the DCS 18 begins to open and close, regulating the current to the SMA wire 14 and resulting in near-constant SMA actuator 12 velocity. This switching between 0 and 8 Volts occurs at a switching frequency of approximately 27 Hz, as indicated by plot 290. This continues for another 2.4 seconds until stage IV, in which the SMA wire 14 approaches full transformation to the austenite phase and the velocity of contraction slows below the predetermined threshold velocity so that the velocity of the shaft 24 falls below a predetermined speed switching threshold (i.e., the DCS 18 does not open), with velocity of the SMA wire 14 gradually decreasing to zero after another 0.6 seconds. The high switching frequency enables the DCS 18 to closely react to the SMA wire 14 transformation process and constrain the SMA actuator 12 velocity within a small range, mimicking active control using passive components and resulting in near-constant velocity motion of the SMA wire 14 during stage III.

Figure 24:
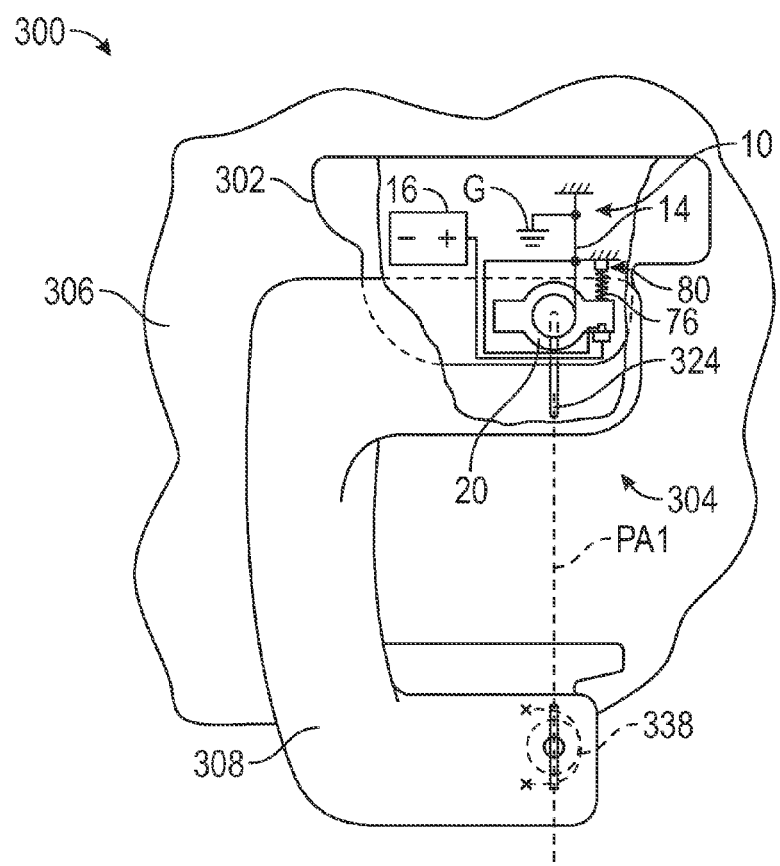
FIG. 24 is a schematic illustration in fragmentary perspective view of a portion of a vehicle having a grab handle assembly with a grab handle shown in a stowed position and with a shape memory alloy actuator and the system of FIG. 1 packaged in a base of the grab handle assembly.
Figure 25:
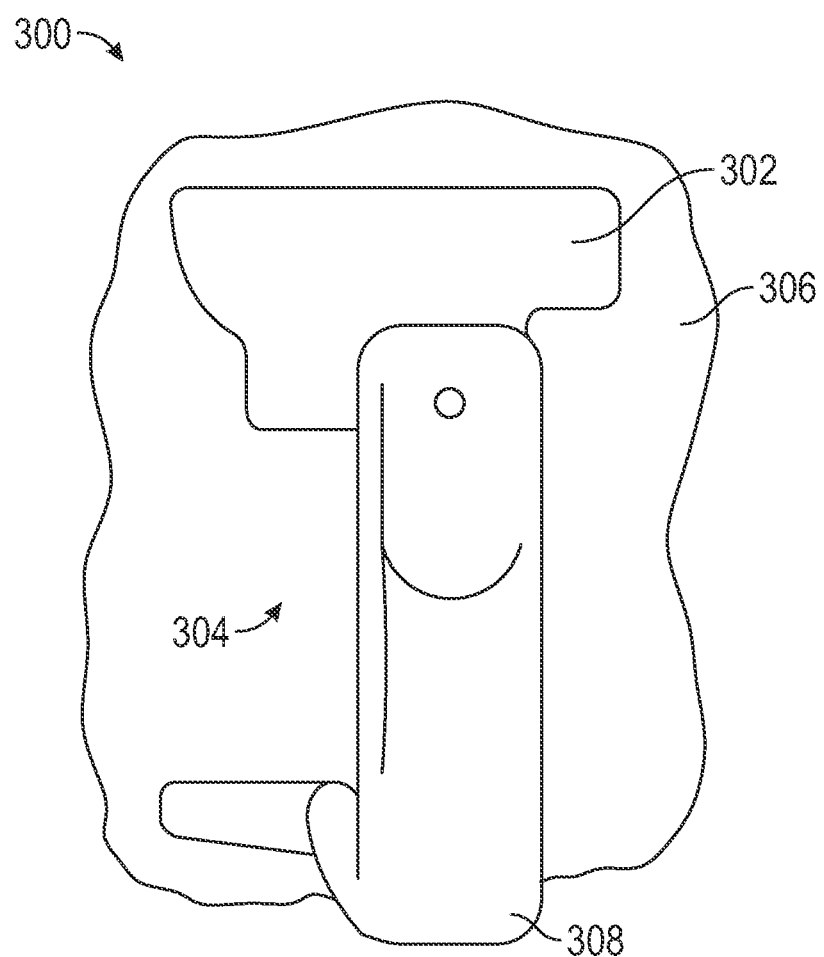
FIG. 25 is a schematic illustration of the portion of the vehicle of FIG. 24 with the grab handle shown in a deployed position when the actuator is fully actuated.

A component operatively attached to the SMA wire 14 to be moved by the SMA actuator 12 therefore moves with a velocity that appears constant to an observer. For example, with reference to FIGS. 24 and 25, the system 10 is implemented in a vehicle 300. More specifically, the system 10 is installed in a base 302 of a grab handle assembly 304. The base 302 is mounted to a pillar or other structural component covered by trim 306. The grab handle assembly 304 includes a grab handle 308 that is pivotable about a pivot axis PA1 to pivot between a stowed position of FIG. 24 and a deployed position of FIG. 25. A torsion spring 338 concentric with the pivot axis PA1 biases the grab handle 308 to the stowed position. The torsion spring 338 acts as a reset spring in place of reset spring 38 of FIG. 1. The damper 20 and a pivot shaft 324 are positioned concentric with the pivot axis PA1. When the system 10 is operated as described with respect to FIG. 1, contraction of the SMA wire 14 causes the grab handle 308 to rotate about the pivot axis PA1 in a counterclockwise direction in FIG. 24 to the deployed position of FIG. 25. After actuation, the torsion spring 338 will act to move the handle 308 back to the stowed position of FIG. 24. To an observer, the motion regulation of the system 10 results in the appearance of near constant velocity of the deploying grab handle 308 from the stored position of FIG. 24 to the deployed position of FIG. 25.

FIGS. 21 and 22 show an alternative embodiment of a system 410 with an SMA actuator 412. The system 410 includes a linear damper 420 for controlling an in-line damper-controlled switch (DCS) 418. The damper 420 and DCS 418 are referred to as linear and in-line as the damping element translates in a linear, rather than a rotary fashion, and they fit inline with the packaging of the SMA wire 14 packaging and the system 410 is therefore very compact. In other words, the entire system 410 is arranged along a center axis C2 along which the damper 420 moves and the SMA wire 14 contracts. The system 410 is relatively less complex than the system 10 and has fewer components.

The system 410 works similarly to the system 10 with the rotary damper 20 in that it also uses a damper 420 acting against a biasing element 476, which is shown as a spring, to open a DCS 418 within a tunable predetermined threshold velocity of the damper 420, delivering nearly constant velocity actuation, and relative insensitivity to voltage and load.

The system 410 includes the damper 420 that is operatively connected to the SMA actuator 12 and has a movable portion that is a shaft 424 configured to translate in the direction of arrow A6 with the SMA wire 14 when the SMA wire 14 contracts during electrical activation. The damper 420 further includes a collar 458 concentrically surrounding a portion of the shaft 424. The system includes a housing 459 that may be tubular, and that concentrically surrounds the collar 458 and through which the shaft 424 extends. The housing 459 is hollow, and may be referred to as a housing tube. Viscous fluid is contained within the collar 458 in a cavity 456 through which the shaft 424 extends. A threaded end 483 threads to the housing 459 to close one end of the housing 459 but includes an opening through which the shaft 424 can translate.

The electronic damper-controlled switch (DCS) 418 includes a first contact 466 formed by or mounted on the electrically-conductive collar 458. The DCS 418 includes a second contact 468 which is a stationary contact screw fixed to the housing 459. The power source 16 is connected to the second contact 468 by an electrical wire 72. The shaft 424 is also electrically-conductive, and the collar 458 remains in sliding or stationary contact on the shaft 424 at all times. The power source 16 is operatively connected to the SMA wire 14 of the SMA actuator 12 only when the DCS 418 is closed. The DCS 418 thus has an open position (FIG. 22) in which electrical power flow to the SMA wire 14 of the SMA actuator 12 through the DCS 418 is prevented, and a closed position (FIG. 21) in which electrical power flow to the SMA 14 through the DCS 418 is permitted.

The biasing element 476 applies a biasing force to the damper collar 458 that urges the DCS 418 to the closed position. An adjustment feature 480 includes an externally-threaded preload adjustment screw 482 threaded to internal threads of the housing 459. By turning the adjustment screw 482, preload on the biasing element 476 is adjusted which changes the magnitude of the biasing force acting on the collar 458. This in turn changes the predetermined threshold velocity at which the collar 458 will move with the shaft 424 and the DCS 418 will open.

When the velocity of the SMA wire 14 and hence the velocity of the shaft 424 exceeds the predetermined threshold velocity, movement of the shaft 424 through a viscous fluid 460 pulls the collar 458 in the direction of movement of the shaft 424 and the biasing force of the biasing element 476 will be overcome. The DCS 418 will thus move to the open position. Electric power from the power source 16 will not flow to the SMA wire 14, and contraction of the SMA wire 14 will slow. The shaft 424 will slow accordingly. When the velocity of the shaft 424 slows to a velocity below the predetermined threshold velocity, the collar 458 will not be moved by the moving shaft 424, and the biasing force of the biasing element 476 will return the collar 458 to the position of FIG. 21, closing the DCS 418. The DCS 418 will oscillate between the closed and open positions in this manner during actuation of the SMA wire 14 to regulate the motion of the SMA wire 14 and of a component (not shown) attached to the shaft 424 for movement with the shaft 424. The SMA wire 14 is anchored to a fixed member 432A and to the shaft 424. A reset spring 438 is operatively connected to the shaft 424 and anchored to a fixed member 432B to provide a reset force that urges the SMA actuator 12, including the SMA wire 14, to return to a start position (such as the position of FIG. 21) following actuation. A component to be moved by the actuator 12 could be connected to the shaft 424 adjacent the reset spring 438. Like the system 10, the damper 420 and DCS 418 of the system 410 are configured to limit the velocity of the shaft 424 over a range of loads and voltages applied to the SMA actuator 412.

Figure 23:
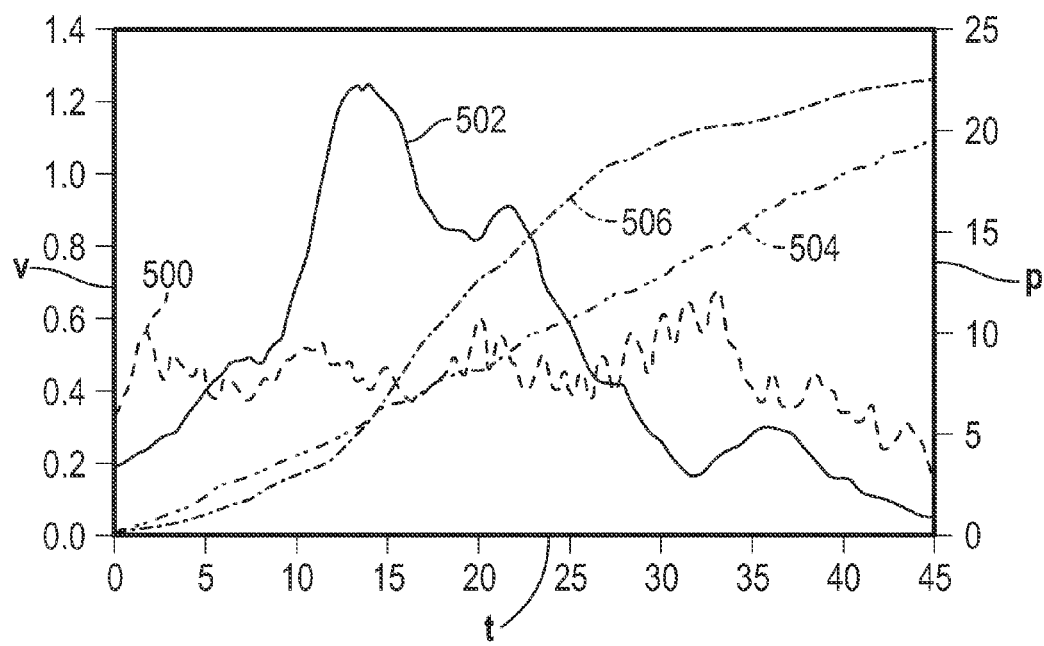
FIG. 23 is a plot of average velocity in millimeters on the left axis and actuator position in millimeters on the right axis versus time in seconds for an end of the shape memory alloy actuator of FIG. 21 during actuation both with and without the linear damper-controlled switch.

FIG. 23 shows plots of average velocity v in millimeters per second (mm/sec) on the left axis versus time t in seconds (s) for an end of the wire 14 of the SMA actuator 412 of FIG. 21 during actuation both with (plot 500) and without (plot 502) the operating DCS 418. FIG. 23 also shows plots of actuator position p in millimeters on the right axis versus time t in seconds (s) for an end of the SMA wire 14 of the SMA actuator 412 of FIG. 21 during actuation both with (plot 504) and without (plot 506) the operating DCS 418. The actuator position p changes at a more constant, nearly linear, rate with time t with the operating DCS 418 (plot 504) than without the operating DCS 418 (plot 506).

While the best modes for carrying out the many aspects of the present teachings have been described in detail, those familiar with the art to which these teachings relate will recognize various alternative aspects for practicing the present teachings that are within the scope of the appended claims.

The invention claimed is:

1. A system for controlling motion of a shape memory alloy actuator, the system comprising:
    a damper operatively connectable to the shape memory alloy actuator and having a movable portion configured to move with the shape memory alloy actuator when the shape memory alloy actuator contracts during electrical activation;
    an electronic switch operatively connectable to the shape memory alloy actuator and to the damper; wherein the electronic switch has an open position in which electrical power flow to the shape memory alloy actuator through the electronic switch is prevented, and a closed position in which electrical power flow to the shape memory alloy actuator through the electronic switch is permitted;
    a biasing element applying a biasing force to the damper that urges the electronic switch to the closed position; and
    wherein the damper is configured to overcome the biasing force of the biasing element to move the switch to the open position only when a velocity of the movable portion equals or exceeds a predetermined threshold velocity, and to return to the closed position due to the biasing force of the biasing element when the velocity of the movable portion falls below the predetermined threshold velocity.

2. The system of claim 1, further comprising:
    an adjustment feature operatively connected to the biasing element and adjustable to change a preload on the biasing element and thereby change the magnitude of the biasing force and the predetermined threshold velocity.

3. The system of claim 1, further comprising:
    a reset spring operatively connected to the movable portion of the damper and providing a reset force that urges the shape memory alloy actuator to return to a start position following actuation.

4. The system of claim 1, further comprising:
    a shaft operatively connectable to the shape memory alloy actuator to rotate when the shape memory alloy actuator contracts during electrical activation;
    wherein:
        the movable portion of the damper is a damper rotor secured to the shaft;
        the damper further includes a damper casing;
        the switch includes a first contact mounted on the damper casing, and a second contact fixed relative to the damper casing; and
        the damper casing moves to open the switch only when the velocity of the damper rotor exceeds the predetermined threshold velocity.

5. The system of claim 4, wherein the biasing element is a compression spring positioned to apply the biasing force to the damper casing.

6. The system of claim 5, further comprising:
an adjustment feature connected to the compression spring and adjustable to move the compression spring to change a magnitude of the biasing force of the compression spring on the damper casing.

7. The system of claim 4, wherein the biasing element is a torsion spring positioned between the damper casing and the damper rotor and biasing the damper casing relative to the damper rotor.

8. The system of claim 1, wherein the movable portion of the damper is a shaft operatively connectable to the shape memory alloy actuator to translate along a length of the shaft when the shape memory alloy actuator contracts during electrical activation;
wherein:
the damper further includes a collar surrounding the shaft, and a housing surrounding the collar and through which the shaft extends;
the switch includes a first contact mounted on or formed by the collar, and a second contact fixed to the housing; and
the collar moves the first contact away from the second contact to open the switch only when the velocity of the shaft exceeds the predetermined threshold velocity.

9. The system of claim 1, wherein the damper opens and closes the switch repeatedly during activation of the shape memory alloy actuator to thereby limit velocity of the actuator.

10. The system of claim 1, wherein the damper is configured to limit the velocity of the movable portion over a range of loads and a range of voltages applied to the shape memory alloy actuator.

11. The system of claim 1, wherein the shape memory alloy actuator comprises a shape memory alloy wire.

12. The system of claim 1, further comprising:
an electrical power source operatively connected to the shape memory alloy actuator only when the switch is closed.

13. A vehicle comprising:
a vehicle component;
a shape memory alloy actuator configured to contract when electrically activated; wherein the shape memory alloy actuator is operatively connected to the vehicle component such that the vehicle component moves with the shape memory alloy actuator;
an electric power source;
a damper operatively connected to the shape memory alloy actuator and having a movable portion configured to move with the shape memory alloy actuator when the shape memory alloy actuator contracts during electrical activation;
an electronic switch operatively connectable to the shape memory alloy actuator and to the damper; wherein the electronic switch has an open position in which electric power flow from the electric power source to the shape memory alloy actuator through the electronic switch is prevented, and a closed position in which electric power flow from the electric power source to the shape memory alloy actuator through the electronic switch is permitted;
a biasing element applying a biasing force to the damper that urges the electronic switch to the closed position; and
wherein the damper is configured to overcome the biasing force of the biasing element to move the switch to the open position only when a velocity of the movable portion equals or exceeds a predetermined threshold velocity, and to return to the closed position due to the biasing force of the biasing element when the velocity of the movable portion falls below the predetermined threshold velocity, the damper thereby regulating contraction velocity of the shape memory alloy actuator.

14. The vehicle of claim 13, further comprising:
an adjustment feature operatively connected to the biasing element and adjustable to change a preload on the biasing element and thereby change the magnitude of the biasing force and the predetermined threshold velocity.

15. The vehicle of claim 13, further comprising:
a shaft operatively connectable to the shape memory alloy actuator to rotate when the shape memory alloy actuator contracts during electrical activation;
wherein:
the movable portion of the damper is a damper rotor secured to the shaft;
the damper further includes a damper casing;
the switch includes a first contact mounted on the damper casing, and a second contact fixed relative to the damper casing; and
the damper casing moves with the damper rotor to open the switch only when the velocity of the damper rotor equals or exceeds the predetermined threshold velocity.

16. The vehicle of claim 13, wherein the movable portion of the damper is a shaft operatively connectable to the shape memory alloy actuator to translate along a length of the shaft when the shape memory alloy actuator contracts during electrical activation;
wherein:
the damper further includes a collar surrounding the shaft, and a housing surrounding the collar and through which the shaft extends;
the switch includes a first contact mounted on or formed by the collar, and a second contact fixed to the housing; and
the collar moves the first contact away from the second contact to open the switch only when the velocity of the shaft exceeds the predetermined threshold velocity.

17. The vehicle of claim 13, wherein the damper is configured to limit the velocity of the movable portion over a range of loads and voltages applied to the shape memory alloy actuator.

18. The vehicle of claim 13, wherein the shape memory alloy actuator comprises a shape memory alloy wire.

19. The vehicle of claim 13, wherein the vehicle component is a deployable grab handle.

* * * * *